(12) United States Patent
Suzuki

(10) Patent No.: US 6,876,873 B2
(45) Date of Patent: Apr. 5, 2005

(54) MOBILE COMMUNICATION TERMINAL AND DATA TRANSMISSION METHOD

(75) Inventor: Takahiro Suzuki, Shizuoka (JP)

(73) Assignee: NEC Corporation, Tokyo (JP)

( * ) Notice: Subject to any disclaimer, the term of this patent is extended or adjusted under 35 U.S.C. 154(b) by 325 days.

(21) Appl. No.: 09/771,678

(22) Filed: Jan. 30, 2001

(65) Prior Publication Data

US 2001/0011032 A1 Aug. 2, 2001

(30) Foreign Application Priority Data

Feb. 2, 2000 (JP) ...................................... 2000-024909

(51) Int. Cl.⁷ ............................................... H04B 1/38
(52) U.S. Cl. ..................... 455/574; 455/522; 455/343.5
(58) Field of Search ........................ 455/522, 572–574, 455/343.5, 412.1, 412.2, 413; 709/206–207

(56) References Cited

U.S. PATENT DOCUMENTS

| | | | |
|---|---|---|---|
| 5,278,995 A | | 1/1994 | Hwang |
| 5,678,229 A | * | 10/1997 | Seki et al. ................... 455/572 |
| 5,870,685 A | | 2/1999 | Flynn |
| 6,018,642 A | * | 1/2000 | Adachi ...................... 340/7.33 |
| 6,064,876 A | * | 5/2000 | Ishida et al. .............. 455/412.1 |
| 6,108,316 A | * | 8/2000 | Agrawal et al. ............. 370/311 |
| 6,161,020 A | * | 12/2000 | Kim ........................... 455/466 |
| 6,330,436 B1 | * | 12/2001 | Zidel ....................... 455/412.2 |
| 6,345,180 B1 | * | 2/2002 | Reichelt ................... 455/404.1 |
| 6,353,736 B1 | * | 3/2002 | Hiromichi ................... 455/406 |
| 6,356,754 B1 | * | 3/2002 | Onozawa et al. ......... 455/412.1 |
| 6,366,792 B1 | * | 4/2002 | Katsuki ...................... 455/572 |
| 6,411,827 B1 | * | 6/2002 | Minata ....................... 455/566 |
| 6,522,900 B1 | * | 2/2003 | Cho ........................... 455/572 |
| 2002/0128051 A1 | * | 9/2002 | Liebenow ................... 455/574 |
| 2002/0160753 A1 | * | 10/2002 | Campana et al. ........... 455/412 |

FOREIGN PATENT DOCUMENTS

| | | |
|---|---|---|
| GB | 2 292 503 A | 2/1996 |
| GB | 2 292 503 | 2/1996 |
| JP | 5-22188 | 1/1993 |
| JP | 10-271231 | 10/1998 |
| JP | 11-175440 | 7/1999 |
| JP | 11175440 A * | 7/1999 ........... G06F/13/00 |

OTHER PUBLICATIONS

Chinese Office Action dated Jul. 4, 2003.
United Kingdom Search report dated Nov. 15, 2001.
United Kingom Examination Report dated Jul. 24, 2003.
Japanese Office Action dated Jun. 24, 2003 with English translation of pertinent portions.

* cited by examiner

*Primary Examiner*—William Trost
*Assistant Examiner*—Sharad Rampuria
(74) *Attorney, Agent, or Firm*—Whitham, Curtis & Christofferson, P.C.

(57) ABSTRACT

The mobile communication terminal uses a battery as a power source. The mobile communication terminal includes a detector 103, a decision section 105, a transmission-reserved controller 105, 107, and a reserved data transmission controller 105, 107. The detector 103 detects the voltage of the battery acting as a power source. The decision section 105 decides a difference relationship between a voltage level detected by the detector and a prescribed value. The transmission-reserved mail controller 105, 107 stores transmission data as transmission-reserved data into a storage, without starting the transmission operation, when the decision section decides that the detected voltage level is less than the prescribed value, in response to a data transmission request and then maintains its wait state. The reserved data transmission controller 105, 107 radio-transmits the transmission-reserved data to be stored in the storage when the decision section decides that the detected voltage level exceeds the prescribed value after maintenance of the wait state.

16 Claims, 3 Drawing Sheets

MOBILE COMMUNICATION TERMINAL AND DATA TRANSMISSION METHOD

BACKGROUND OF THE INVENTION

The present invention relates to a mobile communication terminal and a data transmission method, each using a battery as a power source.

PDC (Personal Digital Cellular) portable phones and PHS (Personal Handy Phone System) portable phones are well known as a mobile communication terminal using a battery as a power source. Personal phones of this type can transmit and receive electronic mails using the Internet.

When the voltage of a battery acting as a power source is less than a prescribed value, conversations or electronic mails cannot be transmitted or received. In order to deal with such problems, the terminal includes a charger and informs the user of the charged state of the battery. This approach allows the user to readily charge the battery. The terminal informs the user of replacement of a battery or urges the user to replace the battery.

Conventionally, when the voltage level is less than a prescribed value during transmission of an electronic mail, transmission errors occur. This requires retrying the transmission procedure of the mail. Hence, the user is involved in unwanted troubles, that is, checking the voltage level of the power source or paying attention to the voltage level thereof every time an electronic mail is transmitted and received.

SUMMARY OF THE INVENTION

The present invention is made to overcome the above-mentioned problems.

An objective of the present invention is to provide a mobile communication terminal and a data transmission method, each in which a user can implement transmission of data such as electronic mails, without having an awareness of the voltage level of the power source.

In order to achieve the above-mentioned objective, the present invention has the following means and configuration.

According to the present invention, A mobile communication terminal, wherein a battery is used as a power source, comprising: a detector for detecting the voltage of the battery acting as a power source; decision means for deciding a difference relationship between a voltage level detected by the detector and a prescribed value; a transmission reservation controller for storing transmission data as transmission-reserved data into a storage, without starting the transmission operation, when the decision means decides that the detected voltage level is less than the prescribed value, in response to a data transmission request, and thus maintaining its wait state; and a reserved-data transmission controller for radio-transmitting the transmission-reserved data stored in the storage when the decision means decides that the detected voltage level exceeds said prescribed value after maintenance of the wait state.

Moreover, according to the present invention, the transmission data comprises electronic mail data created in the wait state.

Moreover, the present invention further comprising an electronic mail data storage for temporarily storing the created electronic mail data in the storage to wait decision results by the decision means in advance of transmission.

Moreover, according to the present invention, A mobile communication terminal, wherein a battery is used as a power source, comprising: a detector for detecting the voltage of the battery acting as a power source; decision means for deciding a difference relationship between a voltage level detected by the detector and a prescribed value; a transmission reservation controller for ceasing the transmission operation, when the decision means decides that the detected voltage level is less than the prescribed value, during radio transmission of transmission data, storing the transmission data as transmission-reserved data into a storage, and then changing the mobile communication terminal to a wait state; and a re-transmission controller for radio-transmitting again the transmission-reserved data to be stored in the storage when the decision means decides that the detected voltage level exceeds the prescribed value after a change to the wait state.

Moreover, according to the present invention, the transmission data comprises electronic mail data created in the wait state.

Moreover, the present invention further comprising an electronic mail data storage for temporarily storing the created electronic mail data in said storage to wait decision results by the decision means in advance of transmission.

Moreover, according to the present invention, A data transmission method suitable for a mobile communication terminal which uses a battery as a power source, comprising the steps of: detecting the voltage of the battery acting as a power source; deciding a difference relationship between a voltage level detected in the detecting step and a prescribed value; storing transmission data as transmission-reserved data into a storage, without starting the transmission operation, when it is decided in the deciding step that the detected voltage level is less than the prescribed value, in response to a data transmission request, and then maintaining its wait state; and radio-transmitting the transmission-reserved data to be stored in the storage when it is decided in the deciding step that the detected voltage level exceeds the prescribed value after maintenance of the wait state.

Moreover, the present invention further comprising the step of charging said battery after maintenance of the wait state.

Moreover, the present invention further comprising the step of replacing said battery for a new one after maintenance of the wait state.

Moreover, the present invention further comprising the step of creating electronic mail data as said transmission data in the wait state.

Moreover, the present invention further comprising the step of temporarily storing said created electronic mail data into the storage to wait decision results in the deciding step in advance of transmission.

According to the present invention, A data transmission method suitable for a mobile communication terminal which uses a battery acting as a power source, comprising the steps of: detecting the voltage of the battery acting as a power source; deciding a difference relationship between a voltage level detected by the detector and a prescribed value; ceasing the transmission operation when it is decided in the detecting step that the detected voltage level is less than the prescribed value, during radio transmission of transmission data, storing the transmission data as transmission-reserved data into a storage, and thus changing the mobile communication terminal to a wait state; and radio-transmitting again the transmission-reserved data to be stored in the storage when it is decided in the deciding step that the detected voltage level exceeds the prescribed value after a change to the wait state.

Moreover, the present invention further comprising the step of charging said battery after a change to said wait state.

Moreover, the present invention further comprising the step of replacing said battery for a new one after a change to said wait state.

Moreover, the present invention further comprising the step of creating electronic mail data as said transmission data in the wait state.

Moreover, the present invention further comprising the step of temporarily storing said created electronic mail data into the storage to wait decision results in the deciding step in advance of transmission.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

An embodiment of the present invention will be described below with reference to the attached drawings.

Figure 1:
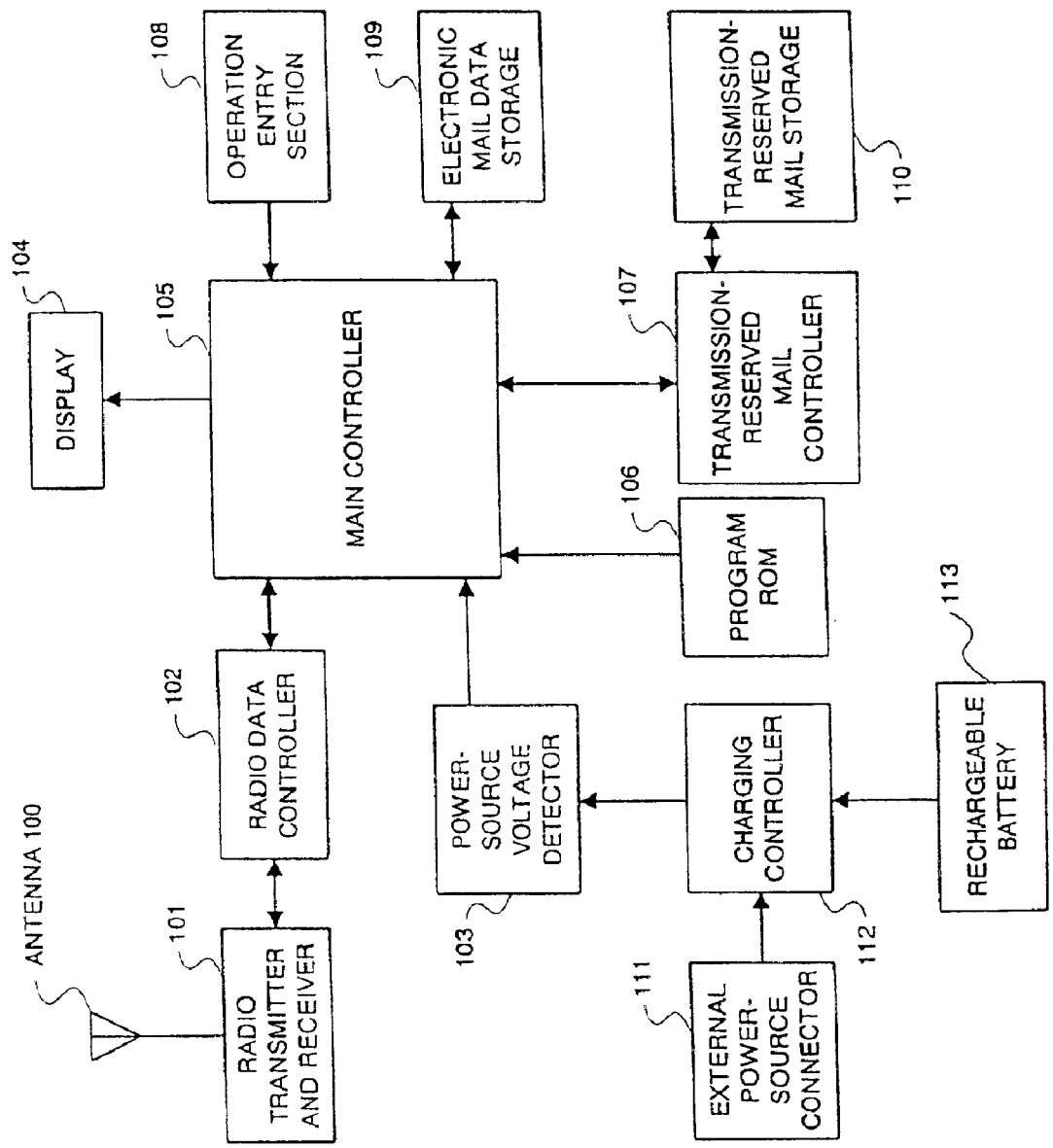
FIG. 1 is a schematic block diagram illustrating a mobile communication terminal according to an embodiment of the present invention.

FIG. 1 is a schematic block diagram illustrating a mobile communication terminal according to an embodiment of the invention. The embodiment corresponds to claims 1 to 10.

Referring to FIG. 1, the radio transmitter and receiver 101 includes an antenna 100 and corresponds to the radio section of a PDC or PHS portable phone which wirelessly transmits and receives electronic mail data to and from a base station. The radio transmitter and receiver 101 also wirelessly transmits and receives voice signals to and from a base station. However, explanation will be now focused on electronic mail data only.

A radio data controller 102 receives electronic mail data to be wirelessly transmitted, from a main controller 105 and creates a format according to self radio information previously registered, thus transmitting it to the radio transmitter and receiver 101.

The radio data controller 102 decodes receive data transmitted from the radio transmitter and receiver 101 and extracts electronic mail data, thus sending it to the main controller 105. The main controller 105 writes electronic mail data transmitted from the radio data controller 102 into an electronic mail data storage 109 and controllably displays the mail on the display 104 according to user's indications from an operation entry section 108.

A power-source voltage detector 103 always checks the voltage level of the rechargeable battery 113 being the power source of the present system via the charging controller 112 and informs the main controller 105 of the detected voltage level value.

The display 104 displays indication data from the main controller 105. The user uses the display 104 to create electronic mail data on the operation entry section 108. The created electronic mail data is not transmitted immediately in response to a transmission request but the main controller 105 temporarily stores it into the electronic mail data storage 109.

The main controller 105 realizes various functions of the system according to the program stored in the program ROM 106 and controllably transmits the electronic mail data related to the present embodiment.

Specifically, the main controller 105 compares a prescribed value with voltage values detected by the power-source voltage detector 103 in magnitude at all times. When the detected voltage value is more than the prescribed value, the main controller 105 extracts electronic mail data from the electronic mail data storage 109, in response to a transmission request from a user, and then hands over it to the radio data controller 102.

When a detected voltage value is less than a prescribed value before or during transmission of electronic mail data, the main controller 105 implements the following steps. That is, (1) when the detected voltage value is less than the prescribed value, the main controller 105 informs the transmission-reserved mail controller 107 of no permission of transmission of electronic mail data. Thereafter, when the detected voltage value restores more than the prescribed value, the main controller 105 informs the transmission-reserved mail controller 107 of permission of transmission of electronic mail data. (2) When the main controller 105 notifies the transmission-reserved mail controller 107 of no permission of transmission before starting transmission, the main controller 105 maintains its wait state without implementing its transmission operation. (3) When the main controller 105 notifies the transmission-reserved mail controller 107 of no permission of transmission during transmission, the main controller 105 halts its transmission operation and then changes to a wait state. (4) After the main controller 105 receives a transmission request from the transmission-reserved mail controller 107 after notification of permission of transmission, the main controller 105 hands over the received electronic mail data to the radio data controller 102.

Next, according to no transmission permission/transmission permission sent from the main controller 105, the transmission-reserved mail controller 107 requests the main controller 105 to store electronic mail data into the transmission-reserved mail storage 110 and to transmit stored electronic mail data.

The operation entry section 108 transfers input information such as electronic mail data or transmission requests input by a user to the main controller 105.

The charging controller 112 monitors whether or not the rechargeable battery 113 is in a fully charged state and notifies the user of the charging state. When the power-source voltage level is lower than an operable level being a prescribed value, the user connects the charging controller 112 to the external power-source connector 111 so that the rechargeable battery 113 can be charged to a power-source voltage level.

The charging operation of the user allows the main controller 105 to check that the power-source voltage level has been recovered to the prescribed value or more.

The correspondences between the above-mentioned configuration and the claims are as follows: The battery corresponds to the rechargeable battery 113. The detector corresponds to the power-source voltage detector 103. The system including the decision means and the electronic mail data storage corresponds to the main controller 105. The system including the transmission-reserved controller, the reserved-data transmission controller and the re-transmission controller corresponds to the whole system including the main controller 105 and the transmission-reserved mail controller 107. The storage corresponds to the combination of the electronic mail data storage 109 and the transmission-reserved mail storage 110.

Figure 2:
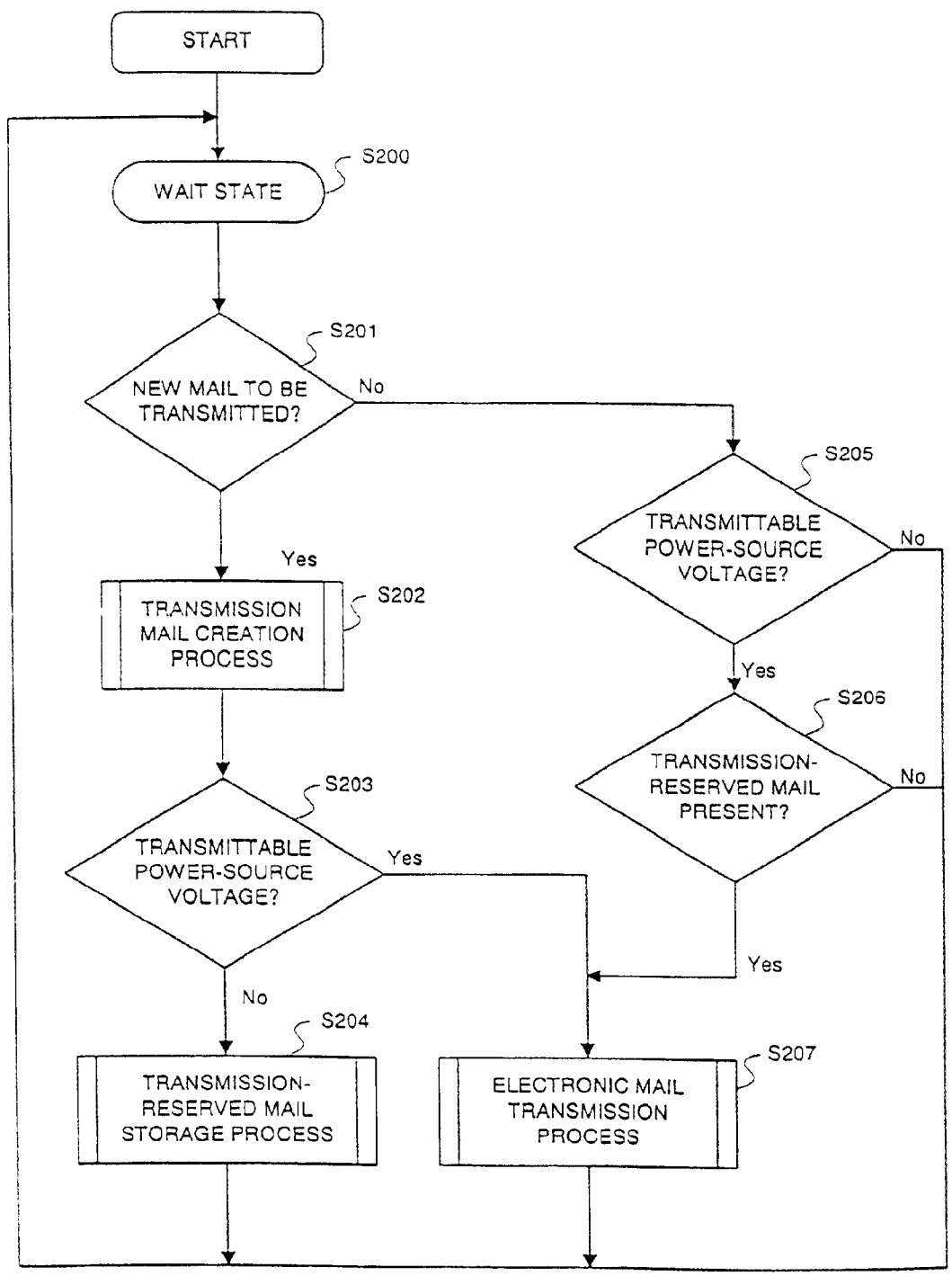
FIG. 2 is an operational flowchart of the first embodiment (where created electronic mail data is transmitted based on the voltage level of a battery) and FIG. 3 is an operational flowchart of the second embodiment (where the voltage level of a battery drops during transmission of electronic mail data).
Figure 3:
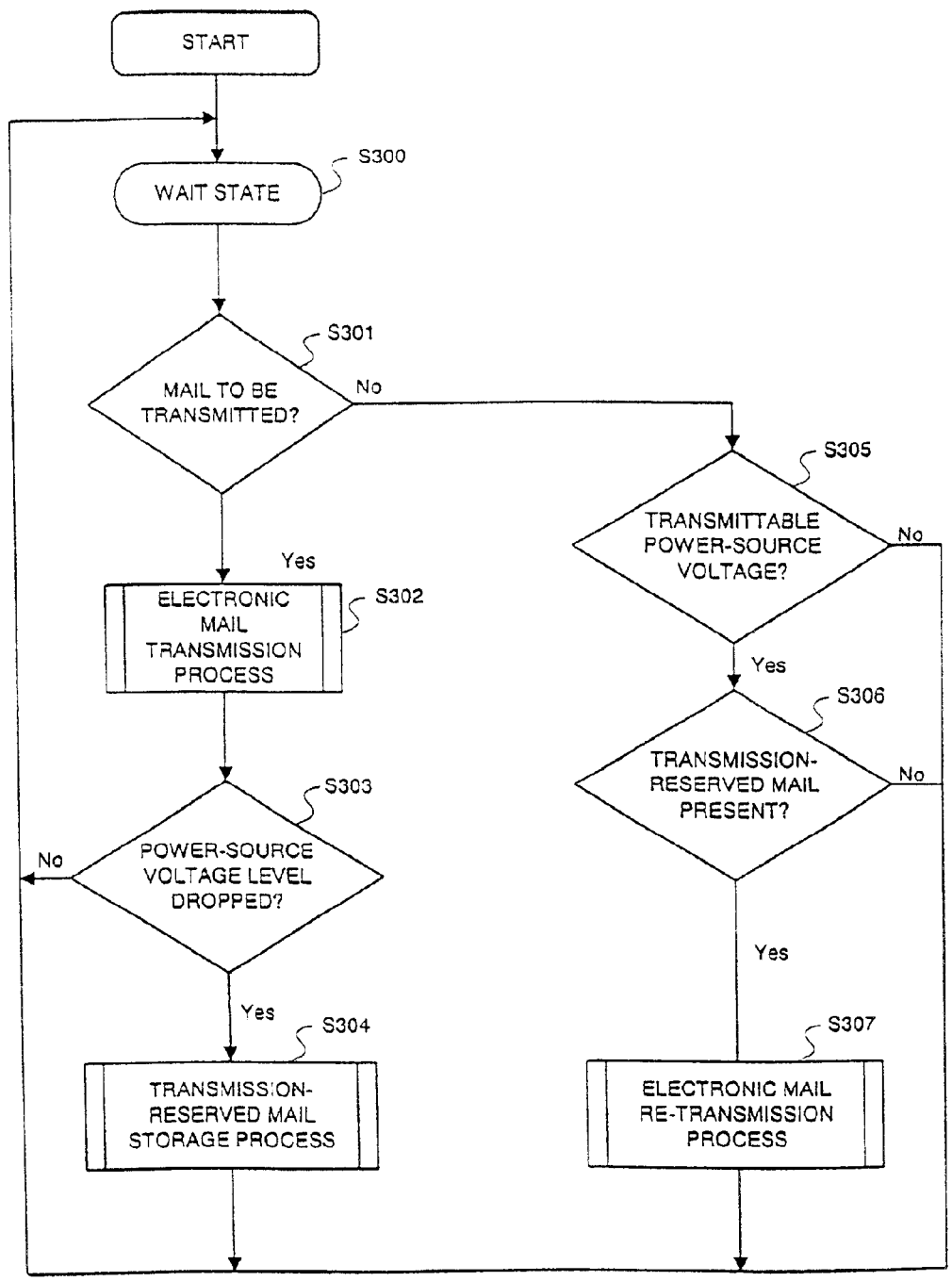

The electronic mail data transmission operation of the mobile communication terminal according to the embodiment will be explained by referring to FIGS. 1 to 3. FIG. 2 shows an operation flow chart according to the first embodiment (where created electronic mail data is transmitted based on the voltage level of the battery). FIG. 3 shows an operation flow chart of the second embodiment (where the voltage level of the battery drops during transmission of electronic mail data).

Now, the electronic mail data transmission operation will be explained by referring to FIGS. 1 and 2. Referring to FIGS. 1 and 2, the main controller 105 waits an entry operation of a new mail transmission request by a user (step S201), in the wait state of the step S200. Meanwhile, the main controller 105 is monitoring whether or not the power source voltage is a prescribed value or more necessary for transmission of electronic mail data (step S205).

When the user inputs a new mail transmission request (step 201: Yes), the main controller 105 displays an electronic mail creation image on the display 104 to implement an electronic mail creation process (step S202). The user inputs the electronic mail data from the operation entry section 108 according to indications on the screen to create the electronic mail data on the screen.

Next, the main controller 105 recognizes the end of the electronic mail creation process by means of a transmission request from the user. The main controller 105 does not immediately transmit the created electronic mail data, but temporarily stores it into the electronic mail data storage 109. Thus, the main controller 105 checks whether or not the power-source voltage is at an electronic mail data transmittable level (step S203).

When the power-source voltage is in a transmittable level, the main controller 105 transmits the electronic mail (step S207). This transmission operation is carried out by extracting electronic mail data from the electronic mail data storage 109 and then handing over it to the radio data controller 102. When the electronic mail transmission process ends, the main controller 105 returns to the wait state (step S200).

When the power-source voltage level is not at a transmittable level, the main controller 105 notifies the transmission-reserved mail controller 107 of no permission of transmission and then implements the transmission-reserved mail storage process (step S204). In other words, the transmission-reserved mail controller 107 extracts electronic mail data from the electronic mail data storage 109 via the main controller 105 and then temporarily stores it into the transmission-reserved mail storage 110.

When receiving notification about the end of the transmission-reserved mail storage process from the transmission-reserved mail controller 107, the main controller 105 maintains its wait state (step S200). When the power-source voltage level does not reach the prescribed value, the charging controller 112 displays the current state so that the user can perform the charging operation. This charging operation is the procedure normally performed. The user does not know that electronic mail data has not been transmitted because of the power-source voltage level, which does not reach the prescribed value.

With no entry for new mail transmission by the user in course of maintaining the wait state in the step S200 (step S201: No), the main controller 105 continues to maintain the wait state when the power-source voltage is less than a prescribed value necessary for electronic mail data transmission (step S205: No).

The above-mentioned charging operation results in a power-source voltage having a prescribed value or more necessary for electronic mail data transmission (step S205: Yes). The transmission-reserved mail controller 107 checks whether or not the transmission-reserved mail storage 110 has transmission-reserved electronic mail data, according to transmission permission sent from the main controller 105 (step S206).

When the transmission-reserved mail storage 110 holds electronic mail data in a transmission reservation state, the transmission-reserved mail controller 107 transmits a transmission request to the main controller 105. The main controller 105 hands over the electronic mail data sent from the transmission-reserved mail controller 107 to the radio data controller 102. This allows the transmission-reserved electronic mail data to be wirelessly transmitted (step S207).

When the transmission-reserved mail controller 107 does not send a transmission request after transmission of transmission permission (step S206: No), the main controller 105 maintains its wait state (step S200).

In the first embodiment as described above, when it is detected that transmission is impossible because of the battery voltage of less than a prescribed value dropped immediately before transmission of created electronic mail data, the electronic mail data is temporarily reserved. The temporarily-reserved electronic mail data is transmitted at the time the battery voltage restored due to the completion of the charging recovers to the transmittable state. The temporarily-reserved data can be transmitted although the user does not know such a state.

Originally, when electronic data cannot be transmitted because of the battery voltage dropped to a prescribed value, the system notifies the user of the trouble and requires the user to perform an charging operation. Thus, the user recreates the created electronic mail data, in addition to the charging operation.

In contrast, according to the first embodiment, when transmission cannot be performed because of the battery voltage dropped to less than a prescribed value, the user does not recognize relationships between transmission of electronic mail data and the necessity of charging operation but merely recognizes only the normal charging operation. Moreover, the user can eliminate the complicated recreation procedure for electronic mail data.

Next, the operation where the voltage level of the battery drops during transmission of electronic mail data will be described below by referring to FIGS. 1 and 3. Referring to FIGS. 1 and 3, the main controller 105 waits for the entry operation (step S301) of a mail transmission request by a user in the wait state in the step S300. Meanwhile, the main controller 105 is monitoring whether or not the power-source voltage is more than a prescribed value necessary for electronic mail data (step S305).

When the user creates electronic mail data on the display 104 and inputs a mail transmission request (step 301: Yes), the main controller 105 executes an electronic mail transmission process, with the power-source voltage at a transmittable level (step S302). This operation is implemented by reading electronic mail data out of the electronic mail data storage 109 and handing over it to the radio data controller 102.

The main controller 105 monitors the power-source voltage level during transmission of electronic mail data (step S303). When the power-source voltage level is more than a prescribed value (step S303: No), the main controller 105 returns to the wait state after completion of the transmission (step S300).

When the power-source voltage level is less than the prescribed value (step S303: Yes), the main controller 105 notifies the transmission reserved-mail controller 107 of no permission of transmission and makes the transmission reserved-mail controller 107 execute the transmission-reserved mail storage process (step S304).

In other words, the transmission-reserved mail controller 107 extracts electronic mail data out of the electronic mail data storage 109 via the main controller 105 and then temporarily stores it into the transmission reserved mail storage 110.

When receiving notification about completion of the transmission-reserved mail storage process from the transmission-reserved mail controller 107, the mail controller 105 halts its transmission operation and then changes to a wait state (step S300). When the power-source voltage level does not reach the prescribed value, the charging controller 112 displays the current state, so that the user can perform the charging operation.

The above-mentioned charging operation is normally implemented. Since the power-source voltage level is less than the prescribed value, the user does not know that the electronic mail data has not been transmitted.

Let us now assume that the user does not input a mail transmission request in the process where the main controller 105 changes to the wait state in the step S300 and maintains it (step S301: No). In such a condition, the main controller 105 continues to maintain its wait state if the power-source voltage is less than the prescribed value necessary for the electronic mail data (step S305: No).

In the above charging operation, the power-source voltage is more than a prescribed value necessary for transmission of electronic mail data (step S305: Yes). Hence, the transmission-reserved mail controller 107 checks whether or not the transmission-reserved mail storage 110 has electronic mail data in a transmission reserved state, according to transmission permission sent by the main controller 105 (step S306).

When the transmission-reserved mail storage 110 has electronic mail data in a reserved state, the transmission-reserved mail controller 107 transmits a transmission request to the main controller 105. The main controller 105 hands over the electronic mail data transmitted from the transmission-reserved mail controller 107 to the radio data controller 102. This allows the electronic mail data reserved during transmission to be retransmitted (step S307).

When not receiving the transmission request from the transmission-reserved mail controller 107 after sending transmission permission (step S306: No), the main controller 105 maintains its wait state (step S300).

As described above, in the second embodiment, when the power-source voltage level drops to less than a prescribed value during transmission, the transmission mail data is temporarily held. Then, the transmission mail data is re-transmitted at the time the completion of charging restores the battery voltage and recovers the transmittable state. The temporarily reserved data can be re-transmitted without the user's perception.

Accordingly, when the battery voltage drops to a prescribed value, in a manner similar to that in the first embodiment, the user merely recognizes the common charging operation, without knowledge of the relationship between transmission of electronic mail data and the necessity of the charging operation. Re-transmission can be implemented without the complicated re-creation procedure of electronic mail data.

FIG. 1 shows the configuration of a mobile communication terminal that uses a rechargeable battery acting as a power source. However, this embodiment is applicable to mobile communication terminals, each which uses an exchangeable battery such as a size AA battery.

In such a mobile communication terminal, the power-source voltage detector 103 monitors the voltage of, for example, an AA battery, instead of the external power-source connector 111, the charging controller 112 and the charging battery 113. In order to prevent data to be erased due to replacement of a battery, a rewritable ROM (Flash ROM) may be used as the electronic mail data storage 109 or the transmission-reserved mail storage 110.

The case where electronic mail data is transmitted has been described above. However, the present embodiment is applicable to the transmission of data having similar conditions.

As described above, in the present invention, the voltage of the battery power source is monitored. When a decrease in voltage level of the battery power source is detected before or during transmission of data, data is temporarily held. Thus, mail data can be automatically transmitted or re-transmitted after recovery of the power-source voltage.

According to the present invention, mail data can be certainly transmitted even when the voltage level of the battery power source is decreased. In the operation, since the user can transmit data, without knowledge of the power-source voltage level by the user, the system operability can be improved. When data corresponds to mail data, the complicated procedure such as retrial of mail creation can be eliminated, so that the operability can more improved.

What is claimed is:

1. A mobile communication terminal, wherein a battery is used as a power source, comprising:
   a detector for detecting the voltage of the battery acting as a power source;
   decision means for deciding a difference relationship between a voltage level detected by the detector and a prescribed value;
   a transmission reservation controller at said mobile communication terminal for storing transmission data as transmission-reserved data into a storage at said mobile communication terminal, without starting the transmission operation, when the decision means decides that the detected voltage level is less than the prescribed value, in response to a data transmission request, and thus maintaining its wait state; and
   a reserved-data transmission controller for radiotransmitting the transmission-reserved data stored in the storage at said mobile communication terminal when the decision means decides that the detected voltage level exceeds said prescribed value after maintenance of the wait state.

2. The mobile communication terminal defined in claim 1, wherein the transmission data comprises electronic mail data created in the wait state.

3. The mobile communication terminal defined in claim 2, further comprising an electronic mail data storage for temporarily storing the created electronic mail data in the storage to wait decision results by the decision means in advance of transmission.

4. A mobile communication terminal, wherein a battery is used as a power source, comprising:

a detector for detecting the voltage of the battery acting as a power source;

decision means for deciding a difference relationship between a voltage level detected by the detector and a prescribed value;

a transmission reservation controller at said mobile communication terminal for ceasing the transmission operation, when the decision means decides that the detected voltage level is less than the prescribed value, during radio transmission of transmission data, storing the transmission data as transmission-reserved data into a storage at said mobile communication terminal, and then changing the mobile communication terminal to a wait state; and a re-transmission controller for radio-transmitting again the transmission-reserved data stored in the storage when the decision means decides that the detected voltage level exceeds the prescribed value after a change to the wait state.

5. The mobile communication terminal defined in claim 4, wherein the transmission data comprises electronic mail data created in the wait state.

6. The mobile communication terminal defined in claim 5, further comprising an electronic mail data storage for temporarily storing the created electronic mail data in said storage to wait decision results by the decision means in advance of transmission.

7. A data transmission method suitable for a mobile communication terminal which uses a battery as a power source, comprising the steps of:

detecting the voltage of the battery acting as a power source;

deciding a difference relationship between a voltage level detected in the detecting step and a prescribed value;

storing transmission data as transmission-reserved data to a storage at said mobile communication terminal, without starting the transmission operation, when it is decided at said mobile communication terminal in the deciding step that the detected voltage level is less than the prescribed value, in response to a data transmission request, and then maintaining its wait state; and radio-transmitting the transmission-reserved data stored in the storage when it is decided in the deciding step that the detected voltage level exceeds the prescribed value after maintenance of the wait state.

8. The data transmission method defined in claim 7, further comprising the step of charging said battery after maintenance of the wait state.

9. The data transmission method defined in claim 7, further comprising the step of replacing said battery for a new one after maintenance of the wait state.

10. The data transmission method defined in claim 7, further comprising the step of creating electronic mail data as said transmission data in the wait state.

11. The data transmission method defined in claim 10, further comprising the step of temporarily storing said created electronic mail data into the storage to wait decision results in the deciding step in advance of transmission.

12. A data transmission method suitable for a mobile communication terminal which uses a battery acting as a power source, comprising the steps of:

detecting the voltage of the battery acting as a power source; deciding a difference relationship between a voltage level detected by the detector and a prescribed value;

ceasing the transmission operation when it is decided at said mobile communication terminal in the detecting step that the detected voltage level is less than the prescribed value, during radio transmission of transmission data, storing the transmission data as transmission-reserved data into a storage at said mobile communication terminal, and thus changing the mobile communication terminal to a wait state; and radio-transmitting again the transmission-reserved data stored in the storage when it is decided in the deciding step that the detected voltage level exceeds the prescribed value after a change to the wait state.

13. The data transmission method defined in claim 12, further comprising the step of charging said battery after a change to said wait state.

14. The data transmission method defined in claim 12, further comprising the step of replacing said battery for a new one after a change to said wait state.

15. The data transmission method defined in claims 12, further comprising the step of creating electronic mail data as said transmission data in the wait state.

16. The data transmission method defined in claim 15, further comprising the step of temporarily storing said created electronic mail data into the storage to wait decision results in the deciding step in advance of transmission.

* * * * *